(12) United States Patent
Peng et al.

(10) Patent No.: US 6,393,523 B1
(45) Date of Patent: May 21, 2002

(54) MECHANISM FOR INVALIDATING INSTRUCTION CACHE BLOCKS IN A PIPELINE PROCESSOR

(75) Inventors: Chih-Jui Peng, San Jose, CA (US); Margaret Gearty, Bath (GB); Naohiko Irie, Santa Clara; Tony L. Werner, San Jose, both of CA (US)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 09/411,452

(22) Filed: Oct. 1, 1999

(51) Int. Cl.[7] .............................................. G06F 12/00
(52) U.S. Cl. ...................................... 711/125; 711/123
(58) Field of Search ................................ 711/125, 140, 711/169, 123

(56) References Cited

U.S. PATENT DOCUMENTS

| | | | | |
|---|---|---|---|---|
| 5,226,130 A | * | 7/1993 | Favor et al. ................. | 395/375 |
| 5,692,152 A | * | 11/1997 | Cohen et al. ................ | 395/467 |
| 5,822,765 A | * | 10/1998 | Boatright et al. ............ | 711/146 |
| 6,038,644 A | * | 3/2000 | Irie et al. .................... | 711/141 |
| 6,101,582 A | * | 8/2000 | Arimilli et al. ............. | 711/141 |
| 6,178,484 B1 | * | 1/2001 | Arimilli et al. ............. | 711/145 |
| 6,182,201 B1 | * | 1/2001 | Arimilli et al. ............. | 711/202 |
| 6,298,418 B1 | * | 10/2001 | Fujiwara et al. ............ | 711/144 |

* cited by examiner

*Primary Examiner*—Matthew Kim
*Assistant Examiner*—Stephen Elmore
(74) *Attorney, Agent, or Firm*—Townsend and Townsend and Crew LLP (57) ABSTRACT

A processor having an execution pipeline and a cache memory including a plurality of cache blocks with instruction words held in selected ones of the cache blocks. An ICBI address buffer is provided for holding addresses of instruction cache blocks to be invalidated by ICBI instructions pending in the processor's execution pipeline. An instruction cache controller coupled to the cache memory generates cache accesses to invalidate specified cache blocks in response to receiving buffered addresses from the ICBI address buffer. Preferably the cache accesses serve to commit ICBI instructions to the instruction cache asynchronously with respect to the processor's execution pipeline.

14 Claims, 5 Drawing Sheets

MECHANISM FOR INVALIDATING INSTRUCTION CACHE BLOCKS IN A PIPELINE PROCESSOR

BACKGROUND OF THE INVENTION

1. Field of the Invention

The present invention relates in general to cache management in microprocessors and, more particularly, to a system, method, and mechanism for instruction cache block invalidation.

2. Relevant Background

Computer programs comprise a series of instructions that direct a data processing mechanism to perform specific operations on data. These operations including loading data from memory, storing data to memory, adding, multiplying, and the like. Data processors, including microprocessors, microcontrollers, and the like include a central processing unit (CPU) comprising one or more functional units that perform various tasks. Typical functional units include a decoder, an instruction cache, a data cache, an integer execution unit, a floating point execution unit, a load/store unit, and the like. A given program may run on a variety of data processing hardware.

As used herein the term "data processor" includes complex instruction set computers (CISC), reduced instruction set computers (RISC) and hybrids. A data processor may be a stand alone central processing unit (CPU) or an embedded system comprising a processor core integrated with other components to form a special purpose data processing machine. The term "data" refers to a digital or binary information that may represent memory addresses, data, instructions, or the like.

In response to the need for improved performance several techniques have been used to extend the capabilities of these early processors including pipelining, superpipelining, and superscaling. Pipelined architectures attempt to keep all the functional units of a processor busy at all times by overlapping execution of several instructions. Pipelined designs increase the rate at which instructions can be executed by allowing a new instruction to begin execution before a previous instruction is finished executing. A simple pipeline may have only five stages whereas an extended pipeline may have ten or more stages. In this manner, the pipeline hides the latency associated with the execution of any particular instruction.

The ability of processors to execute instructions has typically outpaced the ability of memory subsystems to supply instructions and data to the processors. Most processors use a cache memory system to speed memory access. Cache memory comprises one or more levels of dedicated high-speed memory holding recently accessed instructions and data, designed to speed up subsequent access to the same data. Cache may be implemented as a unified cache in which data and instructions are cached together, or as a split cache having separate instruction and data caches.

Cache technology is based on a premise that programs frequently reuse the same instructions and data. When data is read from main system memory, a copy is also saved in the cache memory. In the case of an instruction, subsequent requests for instructions are checked against the cache to see if the information needed has already been stored. If the instruction had indeed been stored in the cache, it is delivered with low latency to the processor. If, on the other hand, the data had not been previously stored in cache then it is fetched from main memory and also saved in cache for future access.

A feature of program instructions is that they often exhibit "spatial locality". Spatial locality is a property that information (i.e., instructions and data) that is required to execute a program is often close in address space in the memory media (e.g., random access memory (RAM), disk storage, and the like) to other data that will be needed in the near future. Instructions tend to have higher spatial locality than data. Cache designs take advantage of spatial locality by filling the cache not only with information that is specifically requested, but also with additional information from addresses sequentially adjacent to the currently fetched address. In this manner if the sequentially adjacent instructions are actually needed, they will already be loaded into cache.

In a split cache or "harvard architecture" cache it is necessary to maintain coherency between the instruction and data caches. In this type of architecture the instruction cache is usually optimized for read operations and has little support for write operations as most implementations do not allow writes to the instruction cache. As a result, the content of the instruction cache can get out of sync with the data cache and main memory when the program performs a store operation into the address space occupied by the program. This occurs in self-modifying code, for example.

One solution to this problem is to define special instructions or special instruction sequences, or both that maintain the instruction cache coherency. These instructions and instruction sequences function to discard or invalidate portions of the cache that are inconsistent and to explicitly synchronize the instruction cache with other instructions. Generally such instructions must be handled carefully by software. All instructions subsequent to an instruction cache block invalidate (ICBI) instruction must be assured that the preceding ICBI instruction has completed. In prior solutions the only way to assure completion was to serialize the ICBI execution (i.e., executed each ICBI by itself in a pipeline) so that the ICBI was committed to the instruction cache before a subsequent instruction was issued to the pipeline. As a result of serialization, each ICBI consumed multiple pipeline cycles before a subsequent instruction was issued. Such restrictions reduce instruction throughput and can significantly affect processor performance in cases where an instruction is changed by a previous instructions or new instructions are brought in from external sources. It is desirable to implement instruction cache invalidate instructions and cache synchronization instructions using existing hardware in an efficient manner that also avoids a need to serialize the instructions.

SUMMARY OF THE INVENTION

The present invention involves a processor having an execution pipeline. A cache memory includes a plurality of cache blocks with instruction words held in selected ones of the cache blocks. An ICBI address buffer is provided for holding addresses of instruction cache blocks to be invalidated by ICBI instructions pending in the processor's execution pipeline. An instruction cache controller coupled to the cache memory generates cache accesses to invalidate specified cache blocks in response to receiving buffered addresses from the ICBI address buffer. Preferably the cache accesses serve to commit ICBI instructions to the instruction cache asynchronously with respect to the processor's execution pipeline.

In a particular example, the execution pipeline includes a fetch stage, a decode stage, one or more execution stages, and a writeback stage. The fetch unit is also coupled to receive interim results generated by the execution stages from a result bus. A decode unit obtains instructions fetched by the fetch unit and can detect an ICBI instruction. The decode unit notifies the fetch unit upon detection of an ICBI. At least one execution unit implements the decoded ICBI, determines an address identifying the cache block to be invalidated and places the address on the result bus. The ICBI address buffer is coupled to the result bus and stores the determined addresses for one or more pending ICBI instructions.

In another aspect the present invention involves a cache synchronization technique in which one or more instruction cache block addresses are buffered where each buffered address is associated with a pending ICBI requests. A synchronization instruction (SYNCI) is executed following the pending ICBI instructions. In response to the SYNCI instruction the processor prevents instructions following the SYNCI from being executed until the pending ICBI instructions are committed to the instruction cache. In this manner, the instructions following the SYNCI are not exposed to the incomplete state created by the pending, uncommitted ICBI instructions. In response to the SYNCI instruction the processor determines when all pending ICBI instructions are committed then restarts execution of instructions following the SYNCI.

In another aspect the present invention involves a method for operating an instruction cache. A plurality of instruction words are loaded into specified blocks in a cache, each block identified by an address and each block being identified as valid or invalid. An instruction cache block invalidate (ICBI) instruction is executed to mark a specified one of the cache blocks as invalid. While the execution is pending, the target address of the ICBI is buffered. The ICBI is considered complete when the target address is buffered. The target address is invalidated in the instruction cache asynchronously with respect to the execution pipeline using the buffered target address.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

The present invention involves an implementation of a processor having a cache system that supports an instruction cache invalidate (ICBI) instruction. The preferred implementation uses existing, general purpose resources within a processor to implement a cache block invalidation. In accordance with the present invention, even though general purpose hardware is used, cache block invalidate instructions need not be serialized and can execute at a pitch of one per pipeline cycle. The example implementation is particularly adapted to a single issue, in-order processor which simplifies the instruction cache block invalidate problem somewhat as the invalidation implementation does not need to handle problems associated with invalidating earlier issued instructions that would be affected by the cache invalidate instruction.

In operation, program code is stored in memory of a computer system and loaded from memory into an instruction cache. Instructions are then fetched from the instruction cache into the CPU core for execution. In the particular examples, the instruction cache cannot be modified directly. However, instructions can be loaded from memory into the data cache and modified there. This is a particularly useful technique for modifying the target address of a branching instruction. In a typical example the new branch target is computed, the branch instruction is modified to reflect the new branch target, and the modified branch instruction is executed to change program flow to the new branch target address.

To execute the modified instruction the modified value must be loaded into the instruction cache as the fetch operation will only fetch from the instruction cache. If the older, unmodified instruction is stored in the instruction cache from a previous load, it must be invalidated. The present invention provides a mechanism by which the older, unmodified instruction can be invalidated in the instruction cache so that the newer, modified information can be loaded into the instruction cache.

An instruction cache block invalidation (ICBI) instruction is executed to accomplish the invalidation. An important feature of the present invention is that the address of a location in the instruction cache that is to be invalidated can be buffered before the address is actually used to invalidate a cache block. The buffer can hold any number of ICBI addresses. This feature makes it possible to continue executing instructions (i.e., avoid stalling) even though the modified cache location has not yet been invalidated. Subsequent instructions are assured that an ICBI will be committed once the ICBI address is buffered. In contrast, conventional implementations cannot be assured that an ICBI instruction has completed until it is actually committed to the instruction cache.

The cache system may be a unified cache, but is preferably a split cache design. In the particular examples herein the instruction cache comprises a plurality of cache blocks, where a cache block is the smallest unit of cache that can be allocated to hold the state of some memory block. Each cache block comprises data from the memory block as well as address information used to provide additional information about the specific memory block that is being cached. These details of the specific examples are provided for completeness and understanding, but it is contemplated that these features may be readily adapted to meet the needs of a particular implementation.

Figure 1:
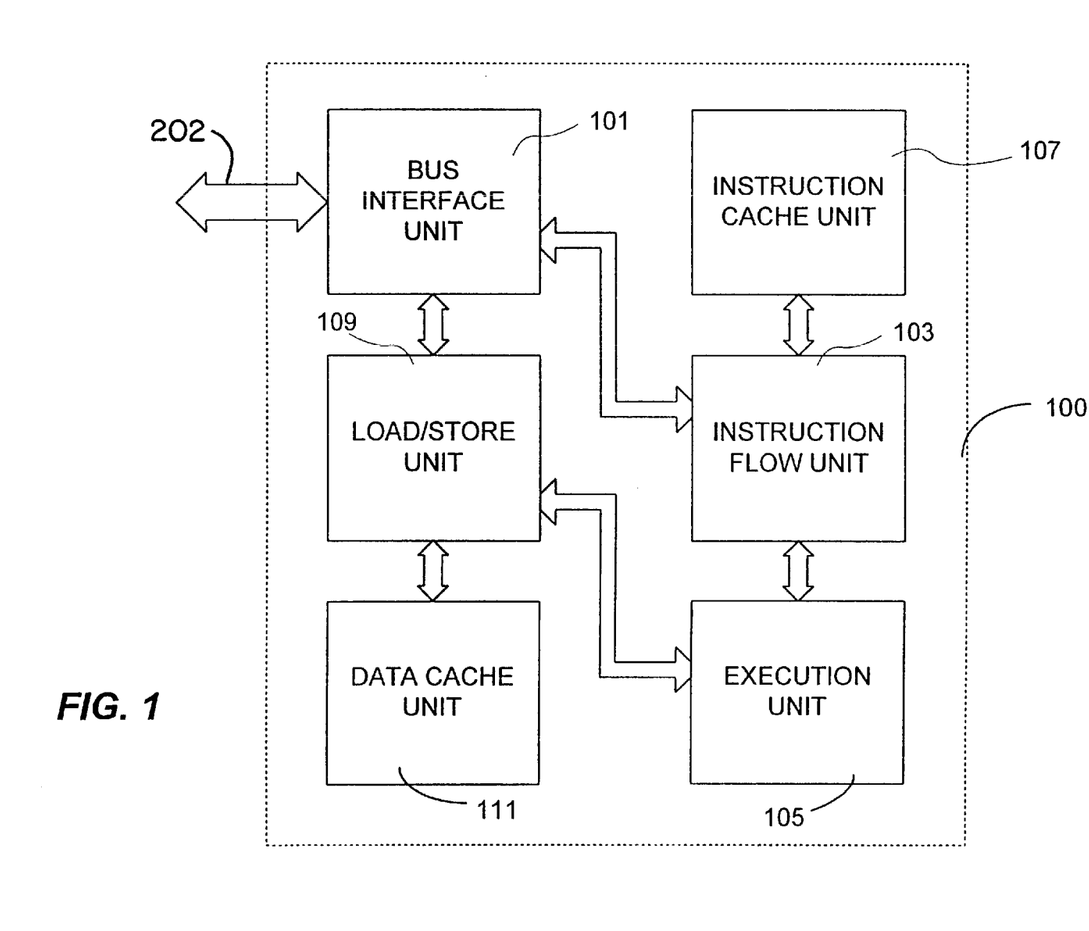
FIG. 1 shows in block diagram form a computer system incorporating an apparatus and system in accordance with the present invention.

A data processing system such as a microprocessor is usefully described as a collection of processes or modules or functional units communicating via defined interfaces as shown in FIG. 1. The functional units comprise large collections of circuitry whose properties are somewhat loosely defined, and may vary in size or composition significantly.

These functional units, discussed in greater detail below, perform the functions of fetching instructions and data from memory, preprocessing fetched instructions, scheduling instructions to be executed, executing the instructions, managing memory transactions, and interfacing with external circuitry and devices.

A bus interface unit (BIU) 101 handles all requests to and from the system bus 202 and external memory (not shown). An instruction flow unit (IFU) 103 is the front end of the CPU pipe and controls fetch, predecode, decode, issue and branch operations in the specific implementation of FIG. 1. An instruction execution unit (IEU) 105 performs operations such as floating point and/or integer math, bit shift and shuffle operations, and other data operations and manipulations necessary to handle integer and multimedia instructions. The main CPU datapath includes an instruction cache unit (ICU) 107 that implements an instruction cache (I$ 301 shown in FIG. 3) and an instruction translation lookaside buffer (ITLB 303 shown in FIG. 3).

Load/Store unit (LSU) 109 handles all memory instructions. A data cache control unit (DCU) 111 includes a data cache (not shown) and a data translation lookaside buffer (not shown). Although the present invention preferably uses separate data and instruction caches, it is contemplated that a unified cache can be used with some decrease in performance. In a typical embodiment, the functional units shown in FIG. 1, may be integrated in a single integrated circuit, although the specific components and integration density are a matter of design choice selected to meet the needs of a particular application.

Figure 2:
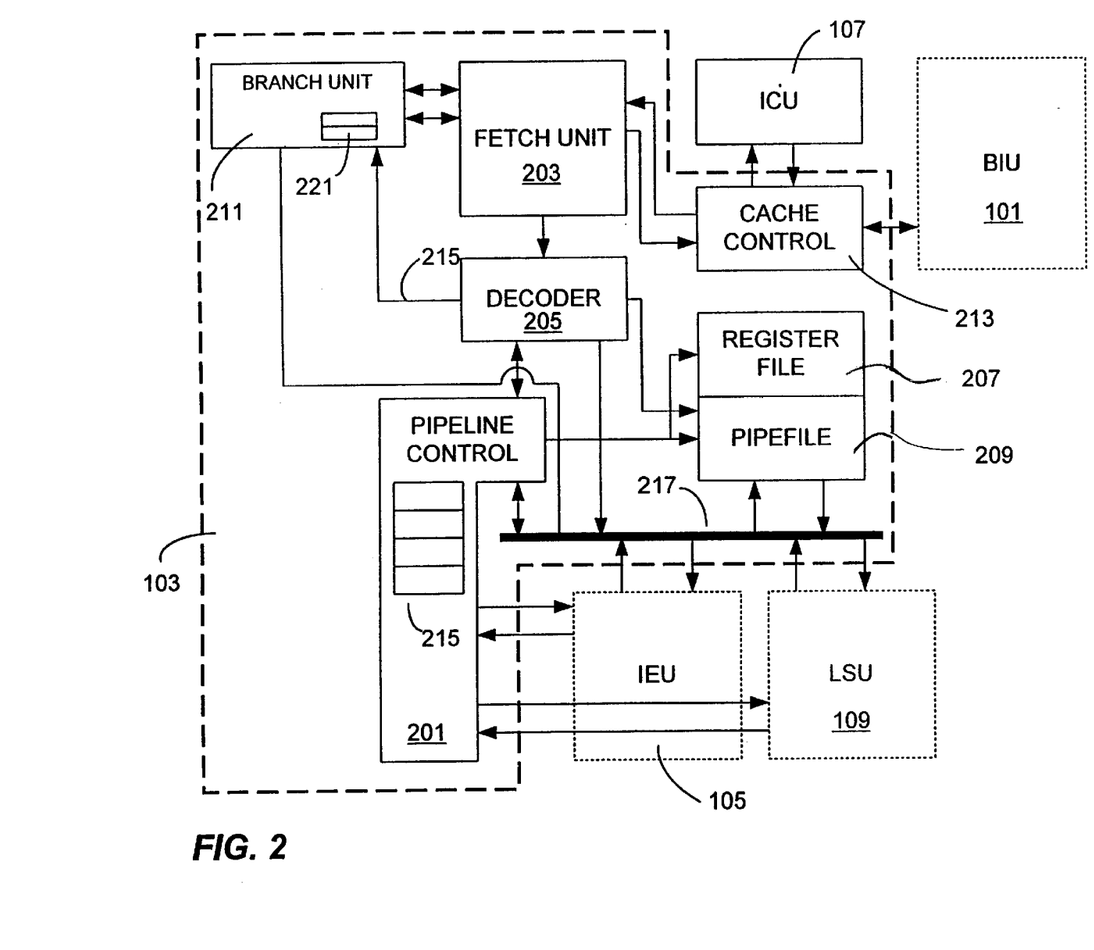
FIG. 2 shows a processor in block diagram form incorporating the apparatus and method in accordance with the present invention.

FIG. 2 shows hardware resources within IFU 103 that are principally involved in the implementation of the present invention. FIG. 2 shows a simplified IFU block diagram with the internal blocks as well as the external interfacing units. As shown in FIG. 2, IFU 103 can be divided into the following functional blocks according to their functions: the Instruction Cache Control Unit (ICC) 213, the Fetch Unit (FE) 203, the Branch Unit (BR) 211, the Decode Unit 205, the Pipe Control Unit 201, and the Operand File Unit comprising register file 207 and pipe file 209.

IFU 103 functions to coordinate the flow of instructions and data within the core 100. Its main functions are to fetch instructions from ICU 107 using fetch unit 203 and decode the instructions in decoder 205. IFU 103 checks for instruction inter-dependency, reads the operands from the register file 207 and sends the decoded instructions and the operands to the execution units (e.g., IEU 105, and LSU 109). In addition, IFU 103 couples to BIU 101 on instruction cache misses to fill the instruction cache within ICU 107 with the missing instructions from external memory.

Because of the sequencing role within the CPU core 100, IFU 103 interfaces with almost every other functional unit. The interface between IFU 103 and BIU 101 initiates the loading of instructions into the instruction cache. The interface between IFU 103 and ICU 107 provides the flow of instructions for execution. The interface between IFU 103 and IMU 105 and LSU 109 provides the paths for sending/receiving instructions, operands, results, as well as the control signals to enable the execution of instructions. In addition to these interfaces, IFU 103 may also receive external interrupt signals from an external interrupt controller (not shown), which samples and arbitrates external interrupts. IFU 103 will then arbitrate the external interrupts with internal exceptions and activates the appropriate handler to take care of the asynchronous events.

Pipe file 209 operates to collect results from the execution units, and writes them back to the register file 207. Once instructions are decoded, pipe control unit 201 monitors their execution through the remaining pipe stages. The main function of pipe control unit 201 is to ensure that instructions are executed smoothly and correctly that (i) instructions will be held in the decode stage until the source operands are ready or can be ready when needed, (ii) that synchronization and serialization requirements imposed by the instruction as well as internal/external events are observed, and (iii) that data operands/temporary results are forwarded correctly.

Another major function of the pipe control unit 201 is to handle non-sequential events such as instruction exceptions, external interrupts, resets, etc. Under normal execution condition, this part of the pipe control unit 201 is always in the idle state. It wakes up when an event occurs. The pipe control unit 201 receives the external interrupt/reset signals from an external interrupt controller. It receives internal exceptions from many parts of the CPU core 100. In either case, the pipe control unit 201 will clean up the pipeline, and then informs the branch unit 211 to save the core state and branches to the appropriate handler. When multiple exceptions and interrupt occur simultaneously, the pipe control unit 201 arbitrates between them according to the architecturally defined priority. The pipe control unit 201 also looks at internal configuration and control registers to determine whether and when an interrupt or exception should be blocked.

The operand file unit implements the architecturally defined general purpose register file 207. In addition, it also implements pipe file 209 described hereinbefore. Because CPU core 100 is principally directed at in-order execution, there is only a small window of time that execution results may be produced out-of-order. This allows for a simplified version of the reorder buffer that enables temporary results to be forwarded as soon as they are produced, while avoiding the expensive tag passing/matching mechanism usually associated with a reorder buffer. The operand file implements the data path portion of this pipe file. Operand/Results bus 217 communicates operands and results amongst the various functional units.

Figure 3:
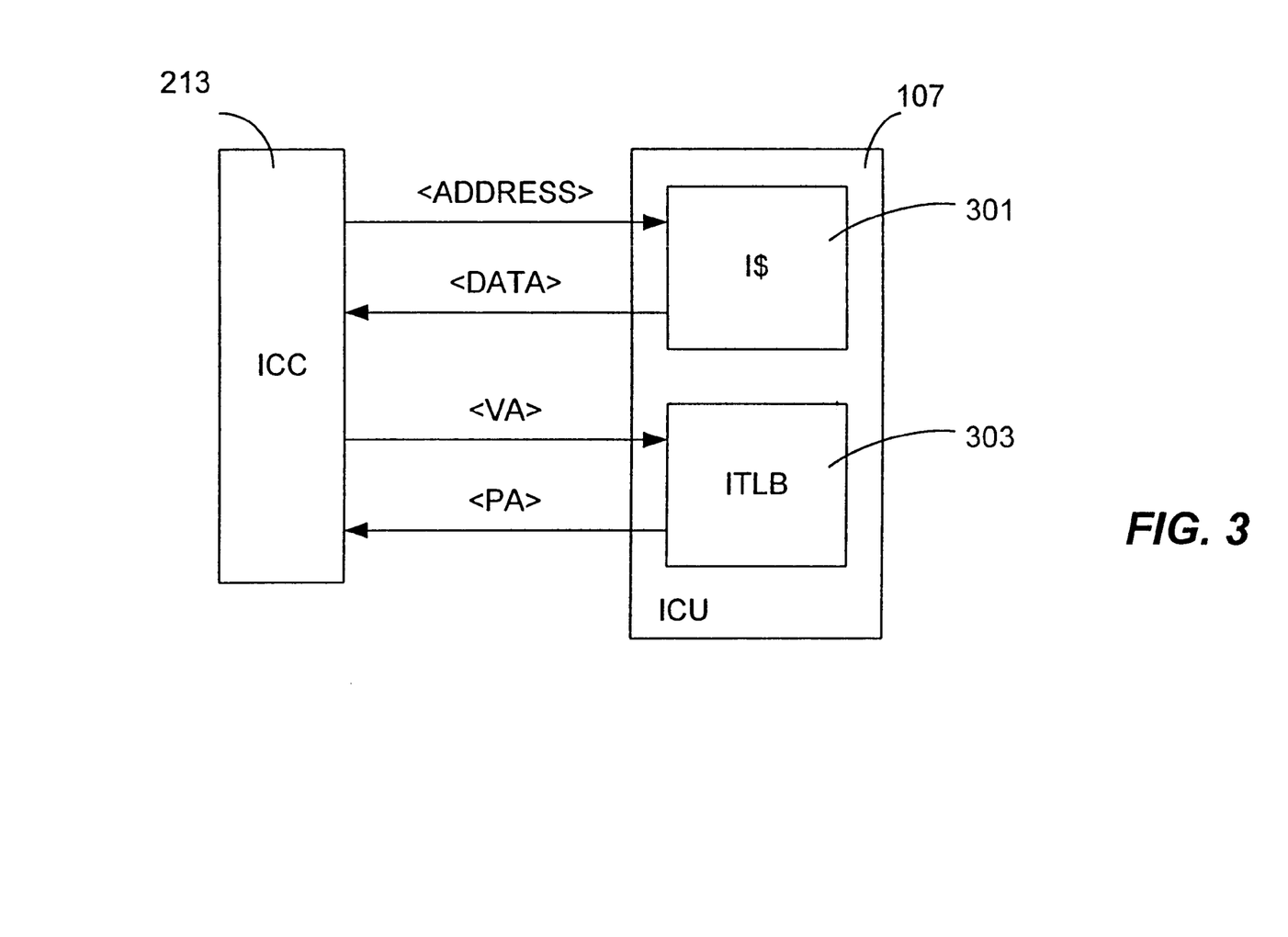
FIG. 3 illustrates an instruction cache unit useful in the implementation of the processor and system shown in FIG. 1 and FIG. 2 in accordance with the present invention.

FIG. 3 shows functional units and interfaces supporting interaction between instruction cache controller 213 and instruction cache unit 107. In the particular example, instruction cache controller 213 is implemented within instruction flow unit 103 as shown in FIG. 2, however, it is contemplated that some implementations will choose to include cache controller 213 as a part of the instruction cache unit 107. ICU 107 includes an instruction cache memory 301 indicated as I$ in FIG. 3, and an instruction translation lookaside buffer 303. ICU 107 is configured as a virtual cache in the example implementation, although this is a design choice made to avoid the need to use ITLB 303 except on a cache miss in I$ 301.

The present invention implements an instruction that invalidates an entire instruction cache block. A cache block is replicated to form a set. The value used to select a cache block from a set is called the "way". The number of ways (also known as the set size and the associativity) is denoted nways, where nways is a power-of-2 and greater than 0. A set is replicated to form a cache. The value used to select a set from a cache is called the index. The number of sets is denoted nsets, where nsets is a power-of-2 and greater than 0.

The associativity of the cache is the number of different cache blocks into which a particular memory block may be mapped. The amount of associativity is given by nways (the set size). If nways=1, then I$ 301 is a direct-mapped cache.

A memory block can be mapped into exactly one cache block in I$ 301. If nways>1 and nsets>1, then this is a nways-way set-associative cache. A memory block may be mapped into any of the nways cache blocks in a particular set in the cache. If nways>1 and nsets=1, then this is a fully-associative cache. A memory block may be mapped into any of the cache blocks in the cache. The cache size in bytes is given by multiplying the cache block size by the set size by the number of sets. In a split cache design the set size and number of sets may differ for each cache.

Figure 4:
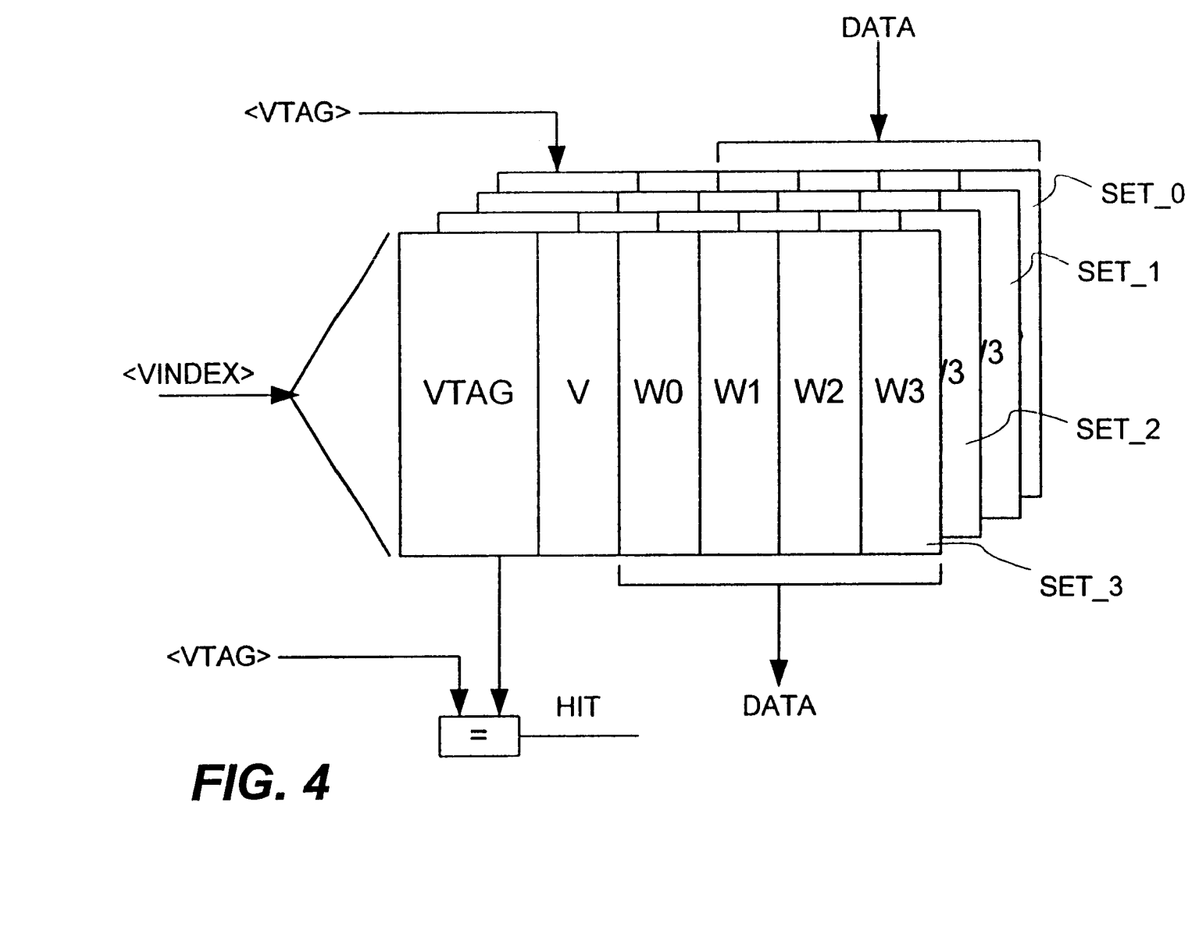
FIG. 4 shows an instruction cache in which features of the present invention are enabled in a particular implementation.

Operation is described with reference to FIG. 3 and FIG. 4 that shows a more detailed block diagram of instruction cache 301. ICC 213 generates address information that is mapped to a particular set (indicated as SET_0, SET_1, SET_2 and SET_3 in I$ 301. Memory blocks are mapped to cache blocks based on the address of the memory block. An memory block address is split into an offset portion, an index portion and a tag portion. The boundaries between these fields are implementation-specific. The offset selects a byte within the cache block. The number of bits in the offset field is log 2 (nbytes). The index selects a set within the cache. The number of bits in the index field is log 2 (nsets). The tag consists of all of the remaining address bits. The number of bits in the tag field is 64–log 2 (nsets)–log 2 (nbytes). In a particular implementation, for example, the instruction cache unit implements a 32 KB cache having 256 sets addressed by 8 index bits, 4-ways, and a 19-bit tag field. Each cache block is 2 KB comprising 256 entries each holding 4 bytes.

The mapping of an address proceeds by using the index portion to identify a set. This set consists of all of the cache blocks that this address may be mapped to. The implementation determines whether this mapping is based on the effective (i.e., virtual) address or the physical address of the access. If there is no translation or if there is an identity translation, then this distinction is immaterial. Additionally, if the smallest page size of the implementation is such that the index of the address is unchanged by the translation process, then again the distinction is not important.

However, if these properties are not all upheld, then the behavior of these approaches is different. The implementation must state whether it indexes after translation (using the physical address), or indexes before translation (using the virtual address). In the latter case, it is necessary to ensure that all effective aliases of a particular address will index into the same set, otherwise the cache operation will be incorrect. This can be achieved by placing constraints on allowed translations.

When an address is held in a particular cache block in a set, the tag is recorded in the cache block to identify this particular address. The index and offset fields need not be recorded as their value is inherent in the cache structure. The implementation determines whether the recorded tag is from the effective address or the physical address of the access. If the implementation does not implement all of the address space, then some of the upper tag bits will be redundant. If the tag is derived from the effective address and n bits of effective address space are implemented, then (64–n) bits of the tag are redundant. Similarly, if the tag is derived from the physical address and n bits of physical address space are implemented, then (64–n) bits of the tag are redundant.

All read and write accesses supported preferably fall within a single cache block. This can be enforced by ensuring that the minimum cache block size is at least as large as the register size of the architecture (i.e., for 64-bit registers, the minimum cache block size should be 8 bytes).

Data caches support write-through and write-back behaviors, however, instruction caches do not support write operations for the particular examples herein.

During a cache access, the index portion of the address is used to select a particular set in the cache. Each set includes n-ways indicated as W0, W1, W2 and W3 in FIG. 4. Each cache block in the set is checked to see if its tag, VTAG, matches (i.e., HIT=1) the tag, <VTAG> of the access. In a particular implementation, only one way is powered up at a time to conserve power during this check. The cache look-up algorithm is designed so that there can be at most one match in the set. If there is no match (HIT=0) then this is a cache miss. Also, a match to a cache block indicated as not valid is treated as a cache miss.

An implementation-defined replacement algorithm is used to select an appropriate cache block in the set. If there is no replaceable cache block, then the access is performed on memory and there is no change to the cache state. If there is a replaceable cache block, then that cache block is replaced. If that cache block is clean, then it can simply be reused; however, if that cache block is dirty, then its data must be written back out to memory before it is reused. The cache block is marked as clean and refilled from the memory address of this access, then the access continues as if the tag had matched. When there is a match, instructions are returned from the addressed instruction cache block.

Each instruction cache block includes a valid bit (V; FIG. 4) indicating whether the associated block's contents are valid. An instruction cache block can be marked invalid by execution of an instruction cache block invalidate (ICBI) instruction. An ICBI instruction is executed in a manner similar to a read operation, but operates to invalidate an instruction cache block, if any, that corresponds to a specified address. In a unified cache design, not shown, and the data in the specified address is dirty, it is discarded without write back.

Following an ICBI instruction, instructions stored at the specified address must be invisible to the CPU. Subsequent fetch operations to the specified instruction cache block should result in a cache miss. However, the ICBI will not effect the cache block valid bit until it has fully executed through the write back pipeline stage. If it is necessary to ensure that no fetches are made from the specified address during the time before ICBI write back while the ICBI flows through the pipeline then a cache synchronization instruction (SYNCI) should be executed following the ICBI. As noted hereinbefore, prior solutions simply serialize the ICBI and prevent fetching at all during this critical period. However, many instances do not require that the cache be synchronized after each and every ICBI. A common example is a series of ICBI instructions used to invalidate multiple cache lines. The present invention provides a mechanism and method to process sequential ICBI instructions without a cache synchronization sequence following each ICBI. To appreciate the efficiency of an ICBI execution in accordance with the present invention it is useful to understand essential features of an exemplary execution pipeline in which an ICBI instruction is executed.

Figure 5:
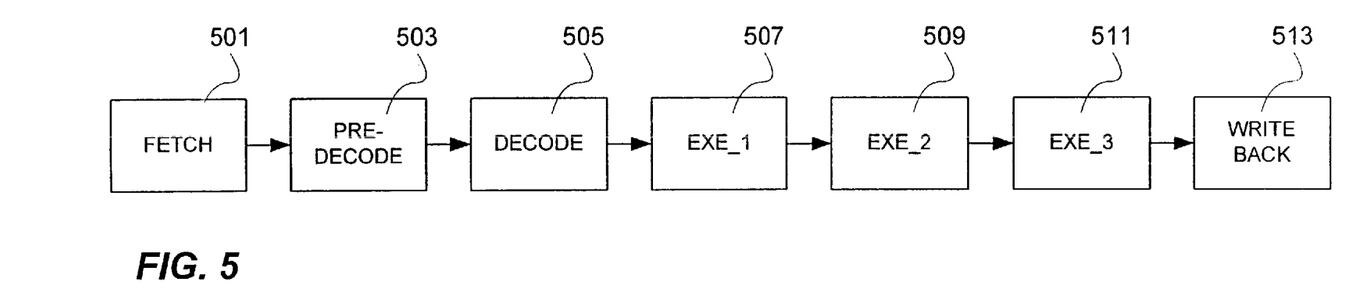
FIG. 5 illustrates a conceptual diagram of an exemplary pipeline processor in accordance with the present invention.
Figure 6:
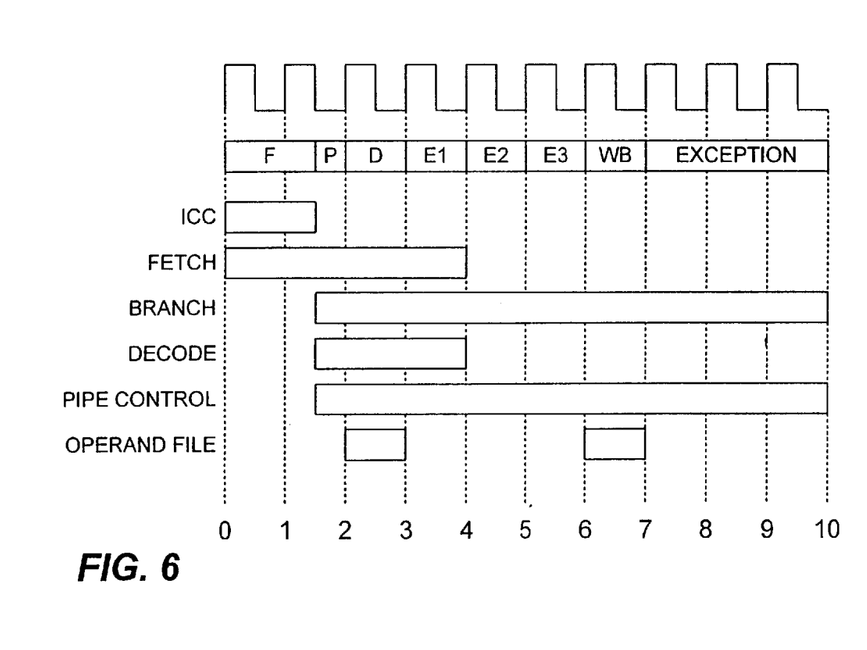
FIG. 6 illustrates example timing of the pipeline processor shown in FIG. 5.

FIG. 5 and FIG. 6 illustrate an example execution pipeline in accordance with the present invention. The particular example is a scalar (i.e., single pipeline), single issue machine. The implementation in FIG. 5 and FIG. 6 includes three execution stages. Many instructions however execute in a single cycle. The present invention implements features to enable comprehensive forwarding within the pipeline to achieve a high instruction throughput.

In the pre-decode stage 503 the instruction cache access which was initiated in the previous cycle is completed and the instruction is returned to IFU 103 where it can be latched by mid-cycle. An instruction may spend from 1 to n cycles in stage 503 depending on downstream pipeline instructions. In the second half of stage 503, some pre-decoding of the instruction will be carried out. Decode stage 505 handles the full instruction decode, operand dependency checks and register file read and instruction issue to the execution units. In decode stage 503 an ICBI instruction is detected and a signal generated to fetch unit 203 to indicate the presence of an ICBI in decode. Fetch unit 203 can then prepare to capture the target address of the ICBI as it becomes available during execution of the ICBI instruction.

The first execution stage 507 implements the execution of all single cycle integer instructions as well as the address calculation for memory and branch instructions. The second execution stage 509 implements the second cycle of execution for all multicycle integer/multimedia instructions. Additionally it corresponds to the second cycle for load instructions. In the case of ICBI instructions, the target address of the ICBI is computed and made available on results bus 217 in the second execution stage 509. The third execution stage 511 implements the third cycle of execution for all multi-cycle integer/multimedia instructions and is a completion stage for load instructions. Write back stage 513 is where all architectural state modified by an instruction (e.g general purpose register, program counter etc.) is updated. The exception status of the instruction arriving in this stage or any external exception can prevent the update in this stage.

One difficulty in the actual implementation of an ICBI instruction is that the valid state of the instruction cache is only accessible through the instruction cache controller 213. ICC 213 contains the mechanisms necessary for addressing and controlling the I$ 301. Also, cache controller 213 is not directly coupled to the operand/results bus 217 and so must obtain addresses for cache accesses from some other functional unit. A straightforward solution is to provide a special-purpose bus connecting into ICC 213 for the purpose of handling ICBI instructions, however, this bus would require multiple control and address lines as well as dedicated logic within ICC 213 to handle the ICBI request.

In accordance with a preferred implementation, existing hardware resources are reused to pass the ICBI command to ICC 213. In one embodiment, decoder 205 notifies branch unit 211 when an ICBI instruction is in decode. Branch unit 211 has the ability to monitor the results busses (i.e., the busses having the results of execution stages 507, 509 and 511). Branch unit 211 already comprises an interface for monitoring the results busses to capture target addresses of branch instructions as they are computed in the execution stages. Branch unit 211 also already includes an interface for forwarding target addresses and commands to fetch unit 203. Hence, no additional hardware is required to enable branch unit 211 to handle ICBI instructions. The only modifications to branch unit entail adding ICBI command to the interface message sets between itself and decoder 205 and fetch unit 203.

Fetch unit 203 is chosen to receive the ICBI instruction because it has a built in address and command interface for communicating with ICC 213. Fetch unit 203 will receive the ICBI command, with the address of the cache block to be invalidated when the ICBI instruction is in EXE_2 stage 509. ICC 213 will receive the ICBI command on the next pipe phase, or when the ICBI command is in the EXE_3 stage. ICC 213 has the ability to physically alter the valid bit of the cache block.

ICC 213 operates to first determine if the address associated with the ICBI command is in the instruction cache 301. This operation is substantially similar to a conventional read operation and is performed by using the index portion of the address to map to a particular set, then comparing the tag portion of the specified address to find a matching tag in the specified set. If there is a "miss", the ICBI is treated as a NOP and pass through to writeback without changing cache state. When there is a "hit" the cache is accessed to change the valid bit(s) corresponding to the specified address.

In order to process ICBI instructions without serialization, the execution path described above should be able to operate at a pitch of one cycle. That is, each pipestage cycle must effectively invalidate one cache block. However, ICU 107 may be busy or otherwise unable to handle the cache line invalidate command on demand. Hence, branch unit 211, fetch unit 203, or cache controller 213 preferably includes a buffer structure 221 for buffering the addresses associated with a plurality of pending ICBI requests to improve the rate at which ICBI's can be successively handled, if desired. In the preferred implementation two address buffers 221 are provided in branch unit 211 enabling up to two pending ICBI addresses to be buffered. More buffer space may be appropriate for deeper pipeline machines, for example. Once the buffers 221 are full, subsequent ICBI instructions must be stalled in decode.

The buffer structure 221 keeps the address to be invalidated available to fetch unit 203 for the entire time the ICBI is in the pipeline. The buffer 221 for a particular ICBI can be safely cleared after the ICBI is completed and the valid bit of the addressed cache block has been changed. The ICBI will be considered complete at the normal writeback stage 513 even though the address for invalidation may still only be buffered at this point in time. The buffered addresses are applied in the order received to cache controller 213 as ICU 107 is available. Using the buffer structure, the buffered ICBI addresses can be applied to ICU 213 asynchronously with respect to the execution pipeline and so do not limit the performance of the execution pipeline.

An ICBI instruction is executed in accordance with the present invention such that when it is in decode stage 405 branch unit 211 is notified immediately. Branch unit 211 checks for available buffer space in buffers 221 and if unavailable branch unit 211 issues a stall signal to decoder 405. The target address to be invalidated will not be determined until the ICBI instruction is in the EXE_2 stage 509, however, by notifying branch unit 211 early it can prepare to handle the ICBI. Branch unit 211 is coupled to a result bus of EXE_2 so that as soon as the address that is the target of the ICBI is determined it can be captured by the branch unit. Branch unit 211 sends the captured address with an ICBI command to fetch unit 203. In this manner, fetch unit 203 can continue to fetch instructions even though some of the instructions will be invalidated in instruction cache 301 by the pending ICBI.

Fetch unit 203 holds a plurality of preloaded instructions, some of which may be stale due to operations of a pending ICBI. In the preferred implementation the fetch unit 203 invalidates these preloaded instructions in response to an instruction cache synchronization instruction (SYNCI). When a SYNCI is decoded the branch unit 211 is informed by decoder 205. In response, branch unit 211 checks to determine if there are any pending ICBI instructions in the execution pipeline. If pending ICBI(s) exist, branch unit 211 asserts a stall signal to pipe control unit 401 until all pending ICBI(s) are complete through writeback and the invalidate instructions sent to instruction cache controller 213 and ICU 107. After the SYNCI instruction is decoded subsequent instructions are not sent to the instruction pipeline until the SYNCI has reached writeback stage 511.

Pipe control unit 401 detects when the SYNCI instruction is in the third execution stage 511 and generates a cancel signal to branch unit 211. The cancel signal causes branch unit 211 to invalidate all preloaded instructions included in the instruction buffer and target instruction buffer within branch unit 211. When the SYNCI instruction is in the writeback stage 513, branch unit 211 sends a program counter value pointing to the next instruction after the SYNCI instruction to the fetch unit to resume fetching instructions.

Conventionally, an ICBI-type instruction must be followed by an instruction or sequence of instructions to synchronize the cache. The cache synchronization process ensures that all previous instructions are completed before any subsequent instruction is fetched. After the instruction cache synchronization process, an instruction fetch to the address that was invalidated will result in obtaining the modified instruction from memory. The present invention eliminates a need to synchronize the cache after each ICBI. This effect is magnified because common code sequences involve several successive ICBI instructions to invalidate a number of cache blocks. The latency caused by serialization or a requirement for instruction cache synchronization after each ICBI can seriously impact instruction throughput.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein to perform precise architectural update in an emulated or simulated out-of-order machine. Accordingly, these and other variations are equivalent to the specific implementations and embodiments described herein.

What is claimed is:

1. A method for operating an instruction cache comprising:
    loading a plurality of instruction words into specified blocks in a cache, each block identified by an address and each block being identified as valid or invalid;
    decoding an instruction cache block invalidate (ICBI) instruction to mark a specified one of the cache blocks as invalid;
    determining a target address for the ICBI instruction;
    buffering the target address for the ICBI while the ICBI is pending; and
    marking instructions fetched from the cache block specified by the invalidate instruction as invalid using the buffered target address.

2. The method of claim 1 wherein the step of decoding comprises:
    informing a fetch unit of the ICBI instruction while the ICBI instruction is in the decoder.

3. The method of claim 2 wherein the step of buffering comprises:
    capturing the target address in the fetch unit while the ICBI instruction is pending.

4. The method of claim 3 wherein the step of marking comprises using the fetch unit to assert a cache block invalidate command along with the captured target address to an instruction cache controller.

5. The method of claim 1 wherein the ICBI is executed in a non-serialized fashion.

6. The method of claim 1 wherein the step of marking is performed asynchronously with respect to the step of determining.

7. A processor comprising:
    a cache memory comprising a plurality of cache blocks;
    instruction words held in selected ones of the cache blocks;
    a fetch unit operative to retrieve instructions from the cache, the fetch unit coupled to receive interim results generated by the processor from a result bus;
    a decode unit operative to obtain instructions fetched by the fetch unit, wherein the decode unit can detect an instruction cache block invalidate (ICBI) instruction and is operative to notify the fetch unit upon detection of an ICBI;
    at least one execution unit operative to determine a target address of the ICBI and place the target address on the result bus;
    a buffer unit coupled to the result bus to capture the target address; and
    an instruction cache controller coupled to the cache memory and coupled to receive the captured target address so as to commit the ICBI instruction to the cache.

8. The processor of claim 7 wherein the buffer unit is configured to capture a plurality of target addresses where each captured target address corresponds to an ICBI instruction.

9. The processor of claim 7 wherein the instruction cache controller operates asynchronously with respect to the at least one execution unit.

10. A method for synchronizing maintaining coherency in a processor having an instruction cache and a data cache, the method comprising the steps of:
    mapping a first location in the instruction cache to a memory location holding an instruction;
    mapping a location in the data cache to the memory location;
    storing a value to the location in the data cache;
    initiating a procedure to invalidate the first location in the instruction cache;
    while the procedure to invalidate is pending, buffering the address of the location in the instruction cache; and
    synchronizing the instruction cache by executing a procedure to prevent further instruction execution until the buffered address invalidating the first location in the instruction cache is committed.

11. The method of claim 10 wherein the procedure to invalidate comprises:
    decoding an instruction to invalidate the first location in the instruction cache;
    notifying the instruction fetch mechanism of the instruction to invalidate;
    determining the address of the first location in the instruction cache; and communicating the determined address to the fetch mechanism.

12. The method of claim 11 wherein the step of synchronizing comprises:

checking the instruction cache to determine if any buffered addresses corresponding to the instruction to invalidate exist in the processor; and when a buffered address corresponding to the instruction to invalidate exists, using the buffered address to invalidate the cache location.

13. The method of claim 10 further comprising:

while the procedure to invalidate is pending, initiating the execution of a second procedure to invalidate a second location in the instruction cache.

14. The method of claim 13 wherein the step of initiating the second procedure to invalidate is performed before executing any procedure to synchronize the instruction cache.

\* \* \* \* \*